(12) United States Patent
LaPointe

(10) Patent No.: US 7,101,110 B2
(45) Date of Patent: *Sep. 5, 2006

(54) OIL-LESS RIVET SYSTEM FOR A RECLINING CHAIR MECHANISM

(75) Inventor: Larry P LaPointe, Temperance, MI (US)

(73) Assignee: La-Z-Boy Incorporated, Monroe, MI (US)

( * ) Notice: Subject to any disclaimer, the term of this patent is extended or adjusted under 35 U.S.C. 154(b) by 178 days.

This patent is subject to a terminal disclaimer.

(21) Appl. No.: 10/842,411

(22) Filed: May 10, 2004

(65) Prior Publication Data

US 2004/0208695 A1    Oct. 21, 2004

Related U.S. Application Data

(63) Continuation-in-part of application No. 10/330,867, filed on Dec. 27, 2002, now Pat. No. 6,939,076, which is a continuation-in-part of application No. 10/196,898, filed on Jul. 16, 2002, now Pat. No. 6,862,777.

(51) Int. Cl.
  *E25G 3/02* (2006.01)
(52) U.S. Cl. ............ 403/365; 403/62; 403/71; 403/243; 403/371; 403/372; 403/390; 403/408.1; 297/68
(58) Field of Classification Search ........... 403/62, 403/65, 70, 71, 243, 365, 371, 390, 372, 403/408.1; 297/68, 69, 70, 83, 88; 16/2.1, 16/2.2; 411/15, 534, 338, 339, 544
See application file for complete search history.

(56) References Cited

U.S. PATENT DOCUMENTS

| | | |
|---|---|---|
| 1,775,517 A | 9/1930 | Flintermann |
| 3,588,787 A | 6/1971 | Kindell |
| 3,670,092 A | 6/1972 | Updyke et al. |
| 3,736,394 A | 5/1973 | Rumbaugh |
| 3,939,529 A | 2/1976 | Davis |
| 4,023,882 A | 5/1977 | Pettersson |
| 4,050,771 A | 9/1977 | Watson et al. |
| 4,067,184 A | 1/1978 | Johnson, Jr. |
| 4,363,580 A | 12/1982 | Bell |
| 4,388,744 A | 6/1983 | Pantke et al. |
| 4,473,714 A | 9/1984 | Brownell et al. |
| 4,863,329 A | 9/1989 | Wilson |
| 4,921,371 A | 5/1990 | Boiraeu et al. |
| 4,958,970 A | 9/1990 | Rose et al. |
| 5,104,190 A | 4/1992 | Siegrist |
| 5,147,151 A | 9/1992 | Hipkins, Jr. |
| 5,397,206 A | 3/1995 | Sihon |
| 5,450,141 A | 9/1995 | Kobayashi |
| 5,562,377 A | 10/1996 | Giannuzzi et al. |
| 5,570,927 A | 11/1996 | LaPointe et al. |
| 5,704,752 A | 1/1998 | Logerot |
| 5,735,021 A | 4/1998 | Briggs |
| 5,812,095 A | 9/1998 | Adrian et al. |
| 5,860,780 A | 1/1999 | Lenac et al. |
| 5,865,678 A * | 2/1999 | Koedam et al. ............ 464/128 |

(Continued)

*Primary Examiner*—Daniel P. Stodola
*Assistant Examiner*—Nahid Amir
(74) *Attorney, Agent, or Firm*—Harness, Dickey & Pierce, P.L.C.

(57) ABSTRACT

A rivet system for use in motion furniture linkage and the like. The rivet system incorporates an electrically conductive plastic washer which eliminates the need for oil lubrication while maintaining the ability to electrostatically paint the linkage assembly.

4 Claims, 8 Drawing Sheets

U.S. PATENT DOCUMENTS

| | | |
|---|---|---|
| 5,906,029 A | 5/1999 | Fox |
| 6,194,675 B1 | 2/2001 | Greer |
| 6,435,791 B1 | 8/2002 | Bydalek |
| 6,607,328 B1 | 8/2003 | Treiber et al. |

* cited by examiner

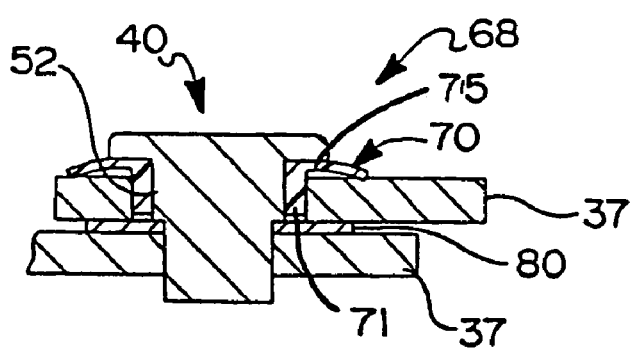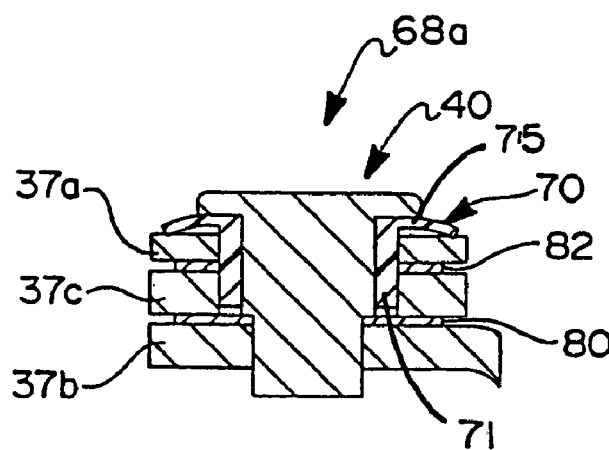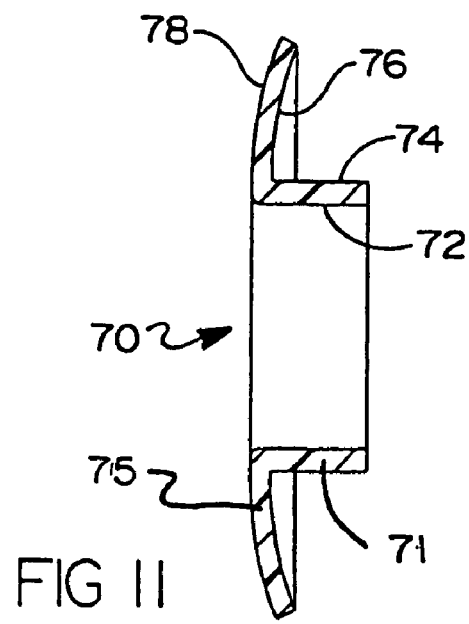

OIL-LESS RIVET SYSTEM FOR A RECLINING CHAIR MECHANISM

CROSS-REFERENCE TO RELATED APPLICATIONS

This application is a continuation-in-part of U.S. patent application Ser. No. 10/330,867 filed on Dec. 27, 2002, now Pat. No. 6,939,076 B2 which is a continuation-in-part of U.S. patent application Ser. No. 10/196,898 filed on Jul. 16, 2002, now U.S. Pat. No. 6,862,777 B2. The disclosures of the above applications are incorporated herein by reference.

FIELD OF THE INVENTION

The present invention relates generally to reclining chairs and, more particularly, to rivets that are used as pivot points such as to allow the chair frame to recline and to extend the legrest of a reclining chair.

Traditionally, reclining chairs are equipped with an actuation mechanism which is operatively interconnected between a prefabricated chair frame and a stationary base assembly. The actuation mechanism is typically a combination of various mechanical linkages operable for providing various comfort features such as independent reclining movement of a seat assembly as well as actuation of an extensible leg rest assembly and associated tilting of the chair frame. Rivet joints are the primary means utilized to fabricate the pivots in these various mechanical linkages. The rivets securely couple the connecting links while allowing a smooth pivoting motion. Some rivet systems utilize an oiled washer to reduce friction within the rivet joint.

Connecting links that are exposed when the legrest is extended are typically coated to prevent oxidation and provide an aesthetically pleasing surface. Coatings that are not electrostatically applied can flake and adversely affect carpet or other flooring. Extreme amounts of flaking may result in damage and carpet replacement. Electrostatic coating the assembly of the connecting links requires a continuous metal-to-metal contact between the connecting links which may not be provided by some rivet systems.

While many conventional reclining chairs operate satisfactorily, furniture manufacturers are continually striving to develop improved actuation mechanisms for reducing system complexity and increasing structural soundness and smoothness of operation. Furthermore, there is a continuing desire to develop improved rivet systems which will result in reduced costs while promoting increased efficiency and improved product quality.

SUMMARY OF THE INVENTION

In accordance with the principles of the present invention, an improved rivet system is disclosed which does not require lubricating oil, which is more simple and less costly to assemble and which reduces manufacturing inconsistencies when compared to conventional rivet systems. The improved rivet system is readily adaptable for use with conventional actuation mechanisms.

In accordance with a preferred embodiment, a wall proximity reclining chair is provided to include the improved rivet system that replaces existing rivets. The rivet system incorporates a plastic bushing to reduce friction within the rivet joint. This rivet system can utilize either a metal wave washer or a plastic spring bushing to reduce the lateral freeplay within the connecting links. A thrust washer between the connecting links of the rivet joint is a plastic and metal composite washer that provides a substantially uniform continuous electrical path between the links. Elimination of the oiled washer will reduce manufacturing time and eliminate the oiling equipment resulting in reduced manufacturing costs. Additional objects, advantages, and features of the present invention will become apparent from the following description taken in conjunction with the accompanying drawings.

DESCRIPTION OF THE DRAWINGS

FIGS. 10a and 10b are enlarged views of an alternate embodiment of the improved rivet system of FIG. 5.

FIG. 11 is a sectional view of a spring shoulder bushing of the improved rivet system of FIG. 10.

DETAILED DESCRIPTION OF THE INVENTION

In accordance with the teachings of the present invention, an improved rivet system for use in single and multi-person articles of furniture (i.e. chairs and sofas or loveseats) is disclosed. A general understanding of the art to which the present invention pertains is disclosed in U.S. Pat. No. 5,570,927n which is commonly owned by the assignee of the present invention and the disclosure of which is expressly incorporated by reference herein. As will be described, the rivet system utilizes a friction reducing bushing that does not require lubricating oil.

Figure 1:
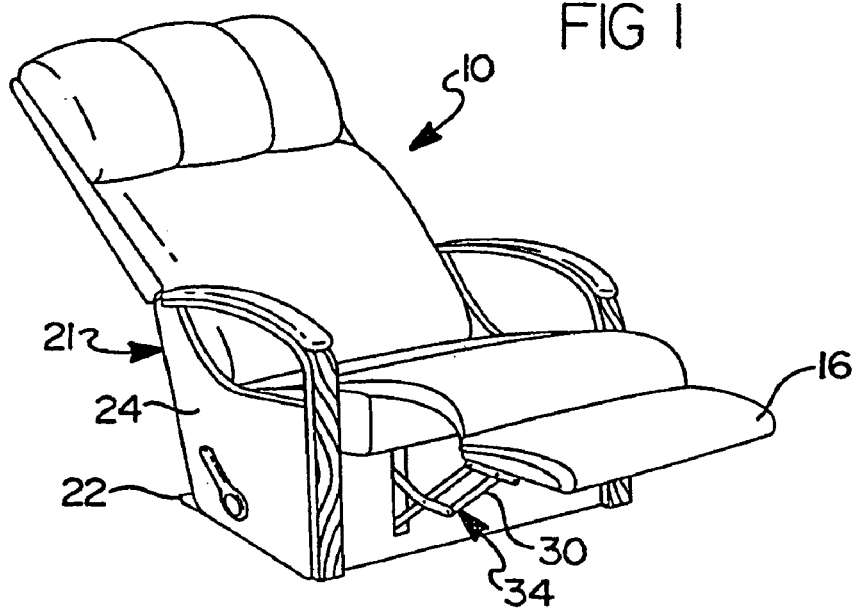
FIG. 1 is a perspective view of a wall proximity reclining/tilt chair in accordance with the present invention.

With reference to FIG. 1, the article of furniture shown is a combination wall proximity recliner and tilt chair, hereinafter referred to wall proximity reclining/tilt chair 10, which includes a pre-assembled actuation mechanism 12.

Figure 2:
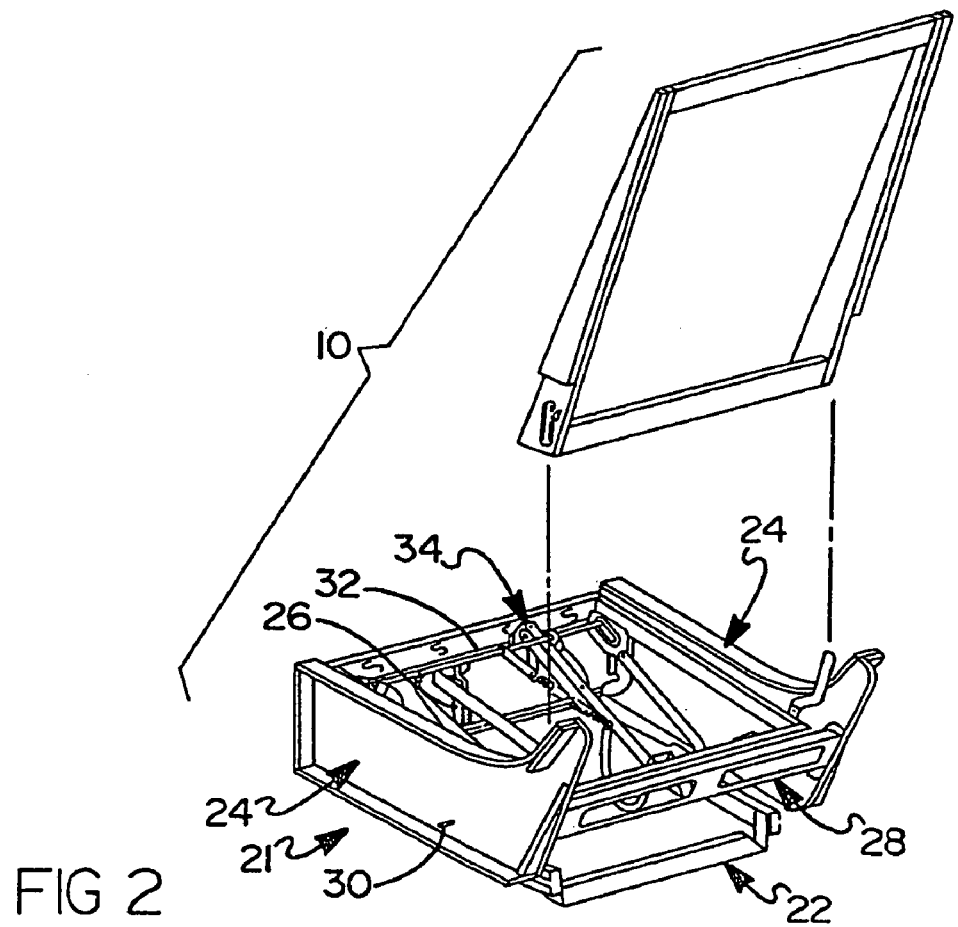
FIG. 2 is a perspective view of the internal frame of the wall proximity reclining/tilt chair shown in FIG. 1.

As best seen in FIG. 2, actuation mechanism 12 of wall proximity reclining/tilt chair 10 is integrated into and operably suspended from chair frame 21 and, in particular, from left and right side frame assemblies 24. In addition to side frame assemblies 24, chair 10 also includes a front rail assembly 26 and a rear rail 28 which, when interconnected, define a rigid "box-like" chair frame. Preferably, most of the structural frame components including side frame assemblies 24, front rail assembly 26 and rear rail 28 are each constructed in a manner which enables them to support springs, padding, upholstery, etc. in order to complete a decorative and stylish reclining/tilt chair 10. More preferably, each of these frame components, except for front rail assembly 26 and rear rail 28, are fabricated from one or more wood panels and/or rails that are fixedly secured together by suitable fasteners, such as dowels, staples, nails and screws, and which may be reinforced at critical joints by metal reinforcement plates or brackets and/or wood corner blocks in a known manner. As previously noted, each frame component is individually pre-assembled for subsequent modular assembly into wall proximity reclining/tilt chair 10. However, it is to be understood that the specific construction shown for each frame component is merely exemplary in nature.

Figure 3:
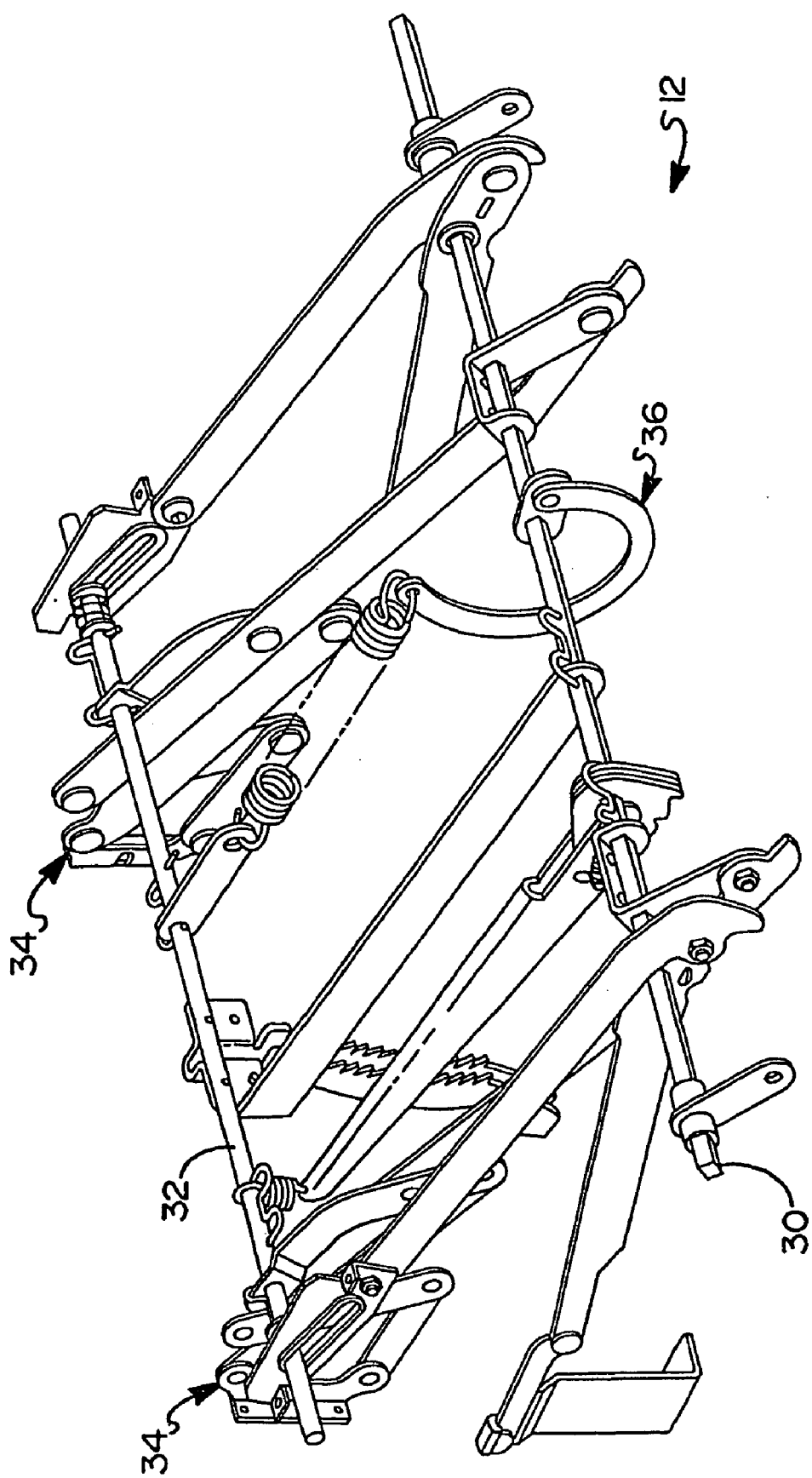
FIG. 3 is an enlarged perspective view of the actuation mechanism shown in FIG. 2.

With reference to FIGS. 2 and 3, actuation mechanism 12 is shown to include a drive rod 30 and front support shaft 32, both of which are spatially oriented to be precisely located and "suspended" from left and right side frame assemblies 24. In the preferred construction, drive rod 30 is an elongated square shaft having a manually-operable handle (not shown) secured thereto adjacent an upholstered exterior portion of one of side frame assemblies 24 and which can be easily reached by a person seated in chair 10 for convenient actuation thereof. In addition, leg rest assembly 16, as shown in FIG. 1, is supported for extensible movement on actuation mechanism 12. More specifically, leg rest assembly 16 includes left and right pantograph linkage mechanisms 34 which is operable associated with drive rod 30 and front support shaft 32 for permitting the seat occupant to selectively actuate leg rest assembly 16 to response to rotation of drive rod 30 via the handle.

Figure 4:
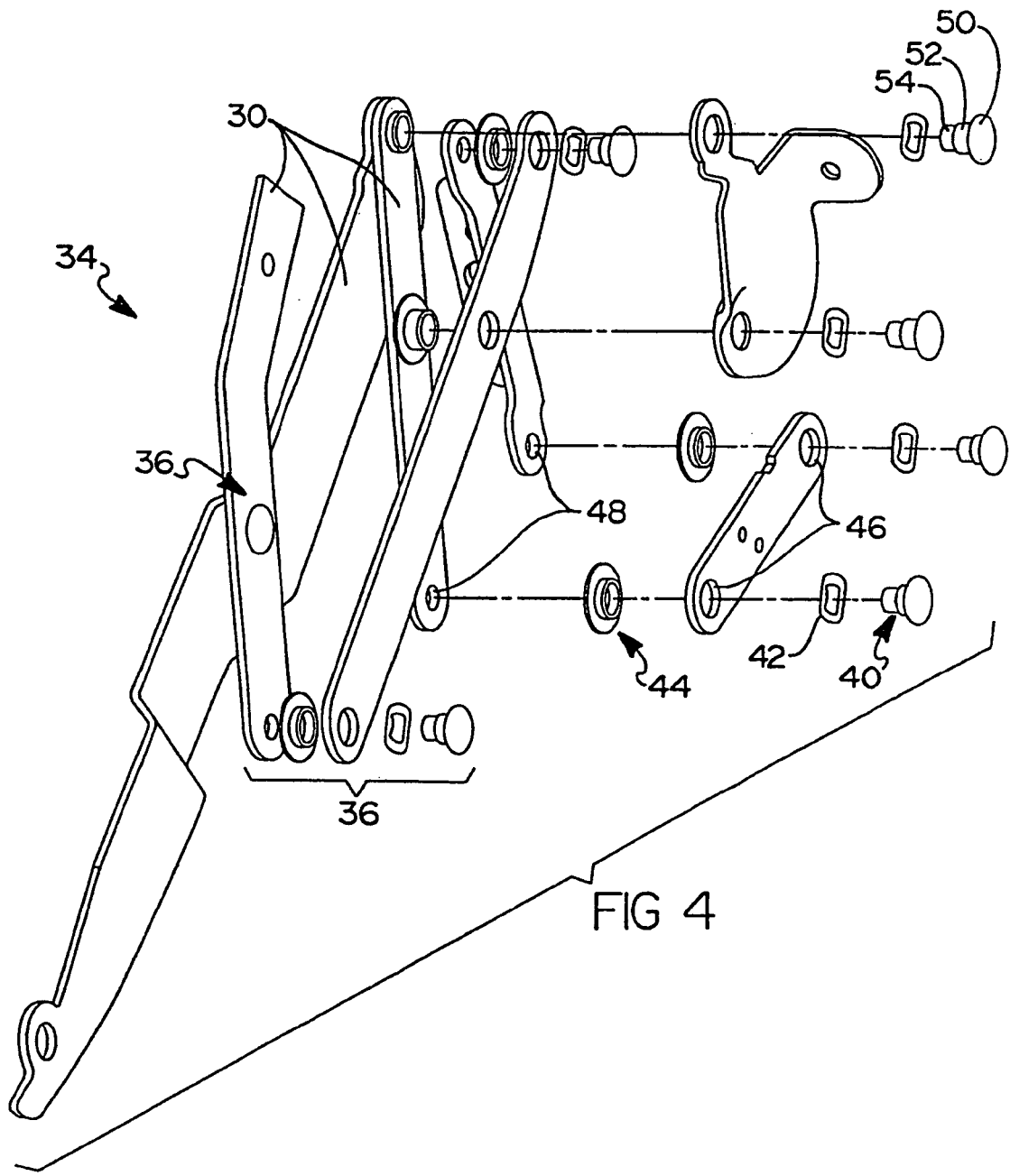
FIG. 4 is an exploded prospective view of a pantograph linkage mechanism shown in FIG. 2 illustrating the improved rivet both partially and fully assembled.
Figure 5:
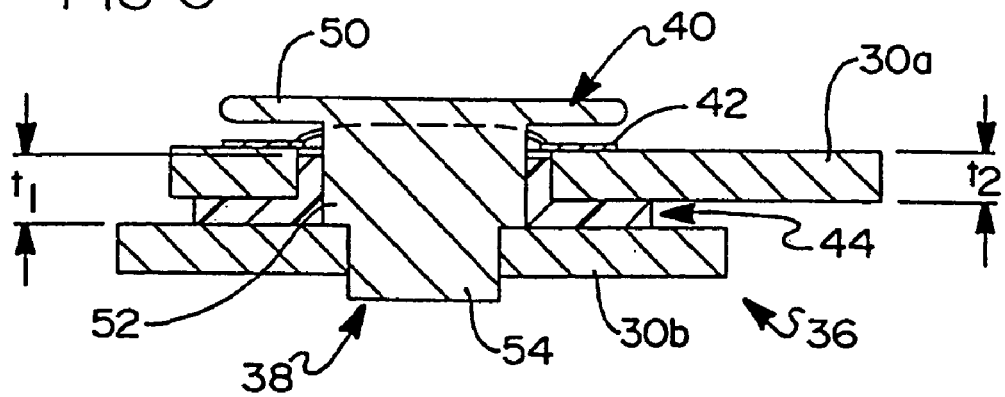
FIG. 5 is an enlarged view of the improved rivet system, fully assembled.
Figure 6:
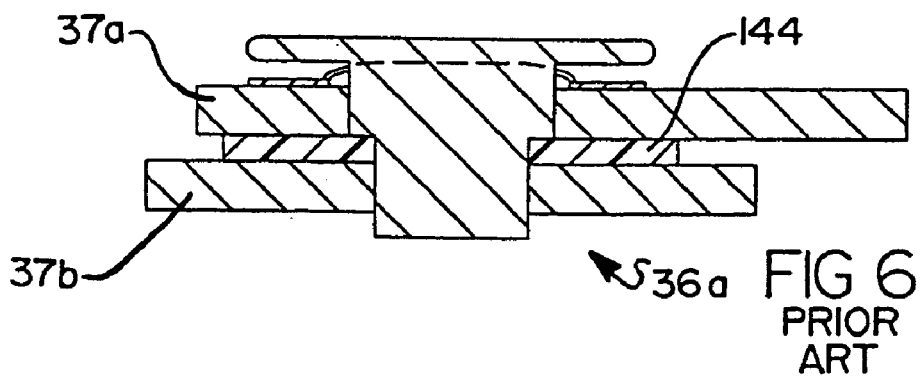
FIG. 6 is an enlarged view of a conventional rivet system fully assembled.

Referring to FIGS. 4 and 5, pantograph linkage mechanisms 34 are assembled with rivet joints 36 and connecting links 37. These joints utilize an oil-less rivet system 38 which allows the connecting links 37 of pantograph linkage mechanism 34 to pivot about a pivot axis. These relative rotations of the connecting links 37 are constrained by the dynamics of the multi-bar linkage design. Rivet system 38 is comprised of rivet 40, wave washer 42, and shoulder bushing 44. Rivet joint 36 is comprised of rivet system 38, a larger linkage connection hole 46 of a connecting link 37 and a smaller linkage connection hole 48 of a connecting link 37. Rivet 40 is of unitary construction comprising rivet head 50, rivet shoulder 52, and tenon 54. With reference to FIG. 6, a prior art rivet joint 36a is shown that includes fiber washer 144 interposed between connecting links 37a, 37b.

Figure 7:
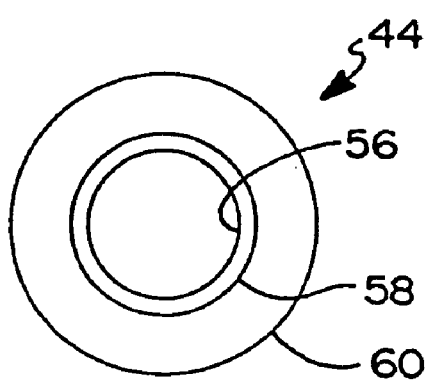
FIG. 7 is a detailed plan view of the shoulder bushing shown in FIG. 5.
Figure 8:
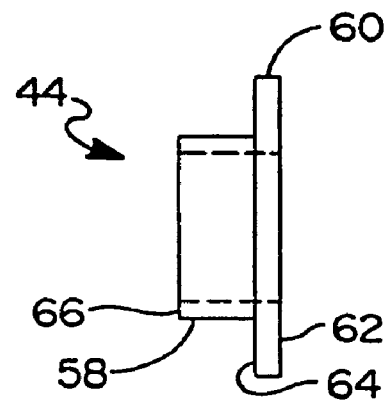
FIG. 8 is a detailed side view of the shoulder bushing shown in FIG. 5.

As shown in FIGS. 7 and 8, shoulder bushing 44 is a unitary construction defined by shoulder bushing inner diameter 56, shoulder bushing outer diameter 58, washer outer diameter 60, washer outer face 62, washer inner face 64, and bushing inner face 66. As shown in FIGS. 4 and 5, shoulder bushing inner diameter 56 rotatably engages rivet shoulder 52. Shoulder bushing outer diameter 58 rotatably engages the larger linkage connection hole 46 of connecting link 37. Smaller linkage connection hole 48 of connecting link 37 is sized to fit tenon 54. The thickness $t_1$ of shoulder bushing outer diameter 58 is less than the thickness $t_2$ of the associated connecting link 37 to allow wave washer 42 to fully engage connecting link 37. As best depicted in FIG. 4, rivet joint 36 may contain a third connecting link 37 by utilizing a rivet 40 with either a longer rivet shoulder 52 or longer tenon 54. With reference to FIGS. 4 and 5, rivet system 38 is assembled with a conventional riveting peening method applied to tenon 54.

Shoulder bushing 44 replaces a conventional oiled fiber washer 144 (as shown in FIG. 6) which functioned as an oil reservoir in a conventional rivet joint. In the conventional system, the rivet joint is assembled and painted using an electrostatic painting process. The fiber washer was then soaked with oil. The conventional system has a shortcoming in that the fiber washer requires lubrication after assembly and painting.

The improved shoulder bushing 44 is constructed of material that is low-friction and self-lubricating when installed between metal connecting links 37, thus eliminating undersired manufacturing inconsistencies. As a preferred embodiment, the shoulder bushing 44 is fabricated of nylon 6/6. However, a skilled practitioner will recognize that other suitable low-friction self-lubricating plastics may be utilized in the present invention. Rivet shoulder 52 extends through link 37a and shoulder bushing 44 to provide a metal-to-metal contacts between the rivet 40 and the link 37b. Thus, good electrical conductivity to the links 37a, 37b is provided by the rivet 40 and the wave washer 42 to promote efficient electrostatic painting.

Some conventional rivet systems, as shown in FIG. 6, utilize a bushing that faces the rivet head and floats between the rivet shoulder and first linkage connection hole to reduce rotational friction. The improved shoulder bushing 44 combines this bushing (if installed) and fiber washer in a one-piece construction to reduce the number of parts required for assembly. Moreover, the link 37a and the shoulder bushing 44 are permitted to slide axially on the rivet shoulder 52 which in combination with the wave washer 42 affords greater latitude for dimensional tolerance of the rivet joint 36.

Wave washer 42 provides an axial spring force within rivet joint 36 to prevent wobble of the joint while concomitantly allowing for tolerance variations in link 37a thickness. The metal construction of wave washer 42 provides an electrical circuit throughout pantograph linkage mechanism 34 which simplifies post-assembly electrostatic painting. As presently preferred, the wave washer is fabricated of a spring steel washer that is plastically deformed to provide the desired force when assembled. However, a skilled practitioner will recognize that other suitable materials and designs may be utilized in the present invention.

Figure 9:
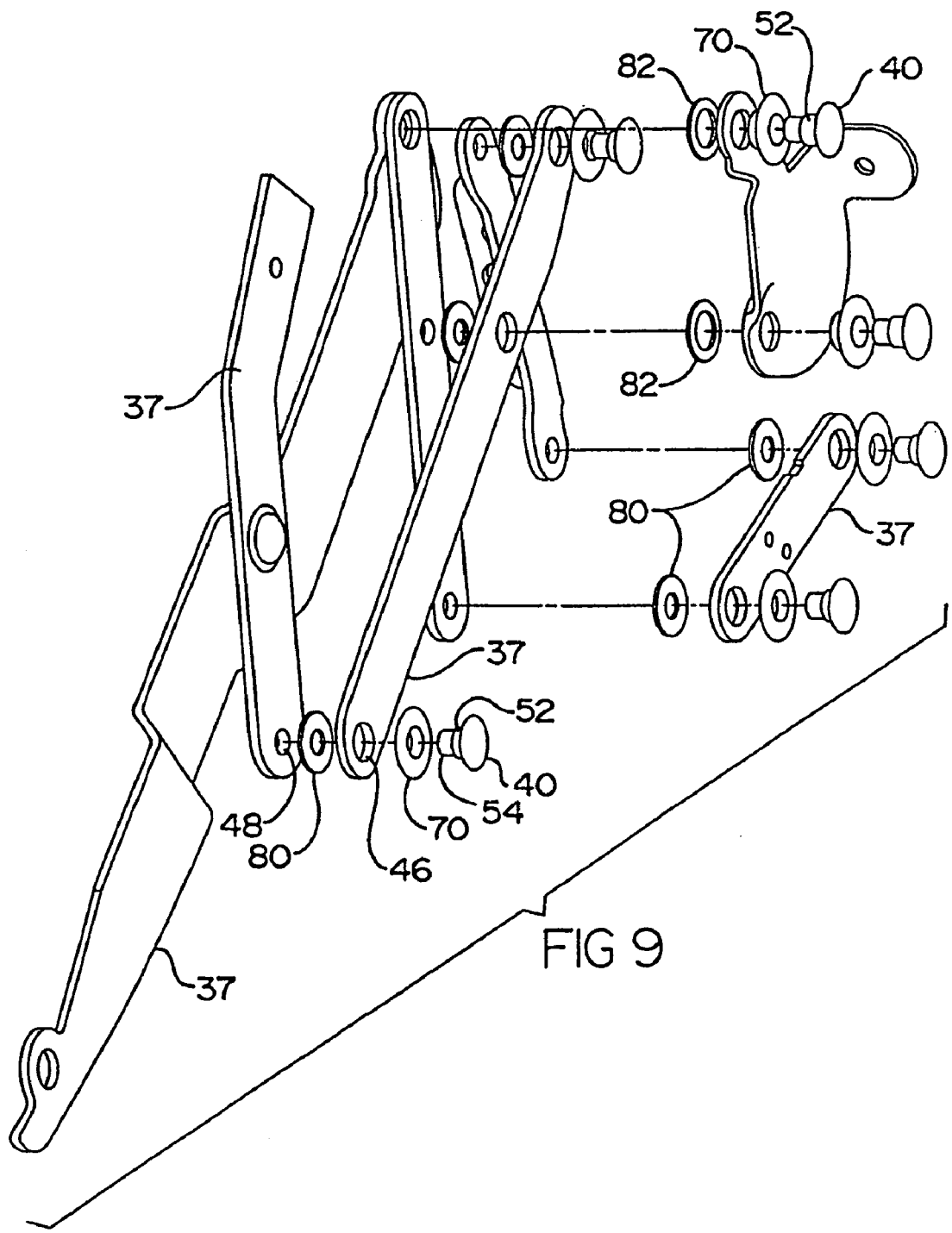
FIG. 9 is an exploded prospective view of a pantograph linkage mechanism incorporating an alternate embodiment of the improved rivet system of FIG. 5.
Figure 12A:
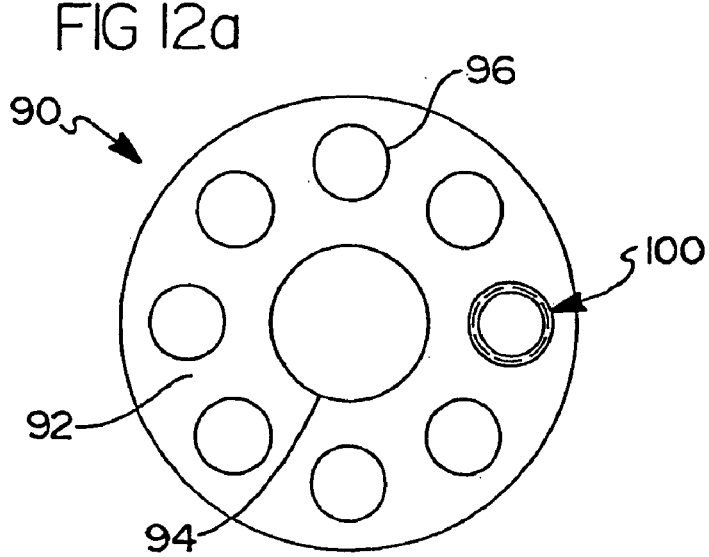
FIGS. 12a and 12b are an alternate embodiment of the thrust washers shown in FIG. 10b.
Figure 12B:
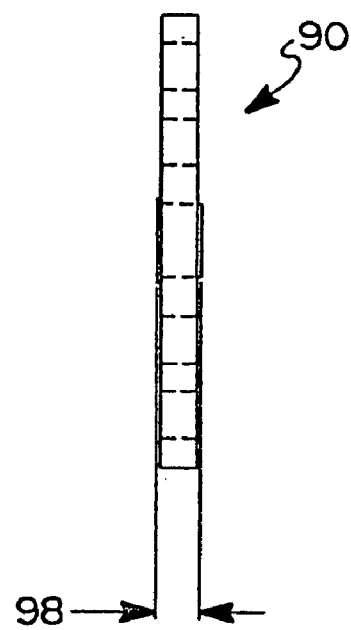

With reference to FIGS. 9 and 10a, rivet joint 68 is shown as an alternate embodiment of rivet joint 36 wherein rivet shoulder 52 of rivet 40 is received within a spring shoulder bushing 70. As best seen in FIG. 11, spring shoulder bushing 70 is of unitary construction and includes a bush portion 71 having a bushing inner surface 72 and a bushing outer surface 74, and a washer portion 75 having a washer inner surface 76 and a washer outer surface 78. The washer portion 75 of spring shoulder busing 70 is dished with washer inner surface 76 forming a concavity. Spring shoulder bushing 70 is preferably constructed of a self-lubricating plastic and more preferably of nylon.

Spring shoulder bushing 70 is received within a larger linkage connection hole 46 of a connecting link 37 where bushing outer surface 74 and at least a portion of washer inner surface 76 are in contact with connecting link 37. Rivet tenon 54 is received within a thrust washer 80 which is interposed between connecting links 37. Thrust washer 80 is preferably constructed of bronze or zinc plated steel to reduce rotational friction between connecting links 37 and provide an electrical circuit connection between the connecting links 37. Tenon 54 is also received within smaller linkage connection hole 48 of a connecting link 37. A conventional riveting/peening process is used to assemble rivet joint 68. When rivet joint 68 is fully assembled, thrust washer 80 is preferably in contact with rivet shoulder 52. Spring shoulder bushing 70 applies an axial force acting circumferentially on rivet head 50 and connecting link 37 to reduce any wobble associated with rivet joint 68.

FIG. 10b discloses rivet joint 68a, essentially similar in construction as rivet joint 68 and including a third connecting link 37c with a larger linkage hole 46 interposed between connecting links 37a, 37b. A larger bore thrust washer 82 is interposed between links 37a and 37c to allow the three links 37a, 37b, 37c to freely rotate. The bushing portion of spring shoulder bushing 70 in rivet joint 68a preferably has a greater axial length than the bushing portion of spring shoulder bushing 70 in rivet joint 68. In this manner, larger linkage hole 46 of third connecting link 37c can contact the bushing outer surface 74 which provides for a low friction joint with reduced wobble. Additionally, spring shoulder bushing 70 reduces the lateral freeplay of pantograph linkage mechanisms 34 that are associated with the use of wave washer 42.

With reference to FIGS. 12a, 12b, 13a and 13b, an alternate embodiment of thrust washers 80, 82 is shown as a low friction thrust washer 90. Low friction thrust washer 90 includes an annular surface 92, a central aperture 94 and at least one eccentric aperture 96. Preferably, a plurality of eccentric apertures 96 (FIG. 12A) are formed in low friction thrust washer 90 to minimize material requirements. Eccentric aperture 96 is formed through thickness 98 of low friction thrust washer 90. A metal contact 100, as discussed below, is interposed through eccentric aperture 96. Low friction thrust washer 90 is preferably injection molded with a self-lubricating plastic and more preferably of nylon 401.

When rivet joints 68, 68a (FIGS. 10a, 10b) are assembled, rivet 40 is interposed through central aperture 94. Central aperture 94 is sized to accommodate tenon 54 if low friction thrust washer 90 is substituted for thrust washer 80. Central aperture 94 is sized to accommodate spring shoulder 70 if low friction thrust washer 90 is substituted for thrust washer 82.

Figure 13A:
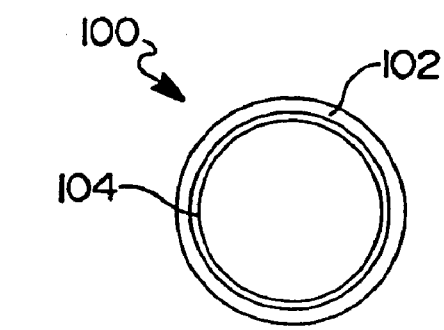
FIGS. 13a and 13b are enlarged views of the metal contact shown in FIGS. 12a and 12b.
Figure 13B:
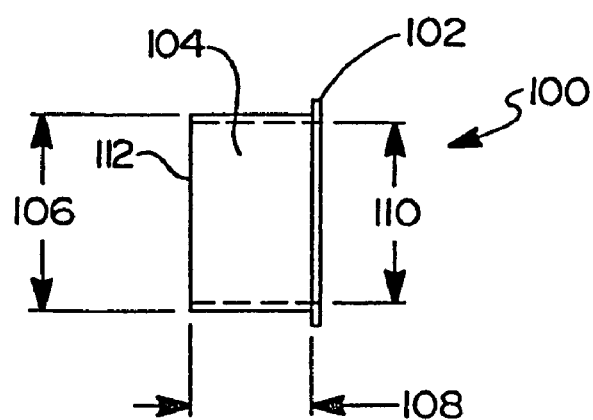

FIGS. 13a and 13b show metal contact 100 in a pre-assembled form. Metal contact 100 is preferably an extruded brass field rivet that includes a flange 102 and a shaft 104 having an outer diameter 106 and a depth 108. Shaft 104 of metal contact 100 is preferably hollow with an inside diameter 110. When low friction thrust washer 90 is fully assembled, shaft 104 is interposed through an eccentric aperture 96. Outer diameter 106 is preferably sized for a slight interference fit with eccentric aperture 96. Flange 102 is secured against annular surface 92 concentric to eccentric aperture 96. Depth 108 is slightly greater than thickness 98. In this manner, distal end 112 of shaft 104 can be flared to secure metal contact 100 within eccentric aperture 96. When rivet joints 68, 68a are fully assembled, metal contact 100 will abut both immediately adjacent connecting links 37. While metal contact 100 is described as a brass rivet, it would be understood by one skilled in the art that metal contact 100 could be any electrically conductive material formed with low friction thrust washer 90 in such a manner so as to allow for electrostatic painting of pantograph linkage mechanisms 34.

In this manner, low friction thrust washer 90 will greatly minimize the metal-to-metal frictional contact surface area within rivet joints 68, 68a while providing adequate electrical contact between connecting links 37 to allow for electrostatic painting of pantograph linkage mechanisms 34.

Figure 14A:
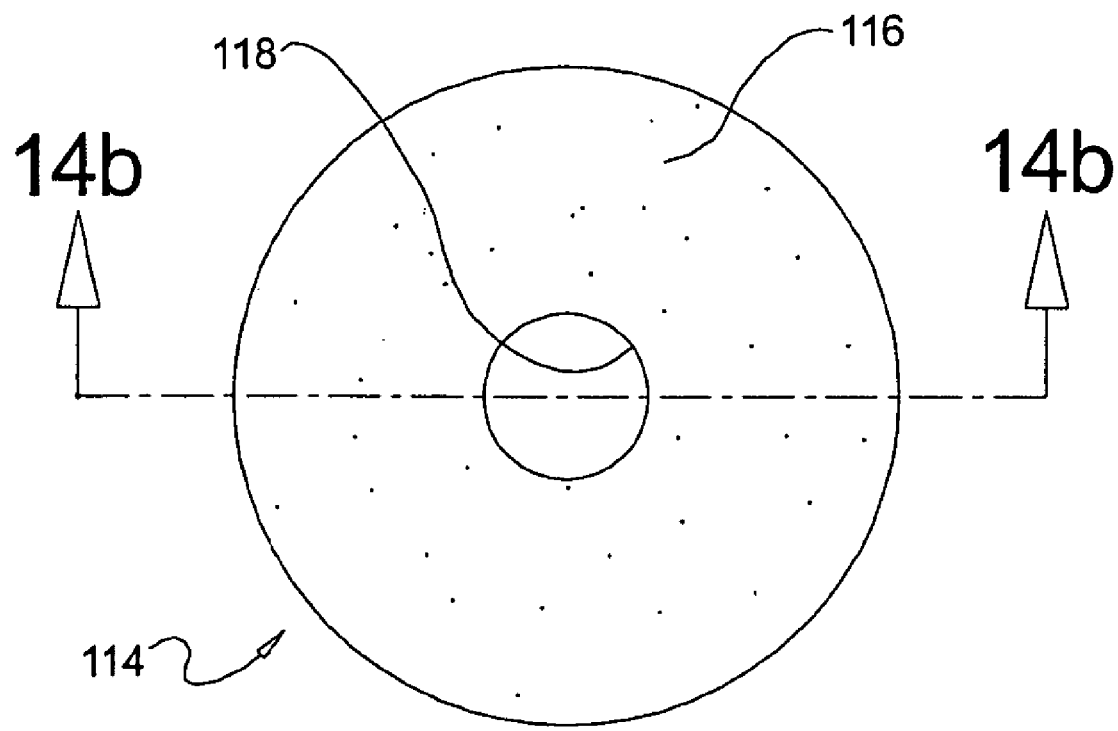
FIG. 14a is another alternate embodiment of the thrust washers shown in FIG. 10b.
Figure 14B:
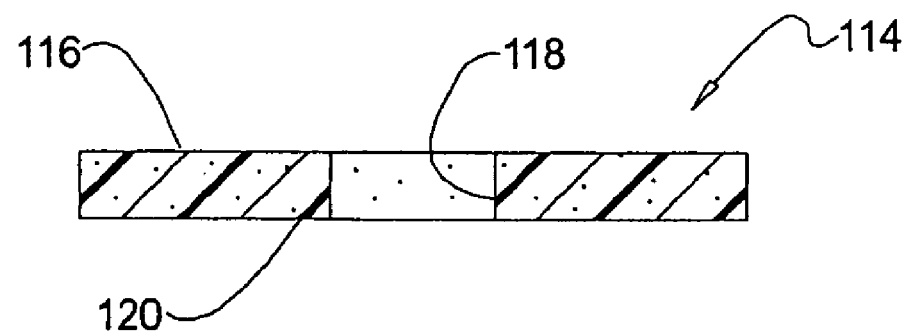
FIG. 14b is a cross-sectional view of the thrust washer of FIG. 14a take taken through line 14b—14b.

With reference to FIGS. 14a and 14b, another alternate embodiment of thrust washers 80, 82 is shown including an electrically conductive plastic thrust washer 114. Thrust washer 114 includes a first face 116, a central aperture 118, and a second face 120. First and second faces 116, 120 have substantially identical surface areas. Thrust washer 114 includes a surface area to thickness ratio of between about 2:1 and about 20:1. In an exemplary embodiment, thrust washer 114 includes a thickness dimension of about 0.030 in., an outer diameter of about 0.75 in., and a central diameter of about 0.380 in. Therefore, an exemplary thrust washer 114 includes a surface area to thickness ratio of about 12:1. One skilled in the art will recognize that the specific dimensions of the washer(s) may vary depending on the requirements of a given application. For example, the dimensions of the washers may range from about ½ to about 1 inch in diameter and between about 0.020 to about 0.070 inches in thickness. Alternatively, thrust washer 114 may include a plurality of eccentric apertures, similar to apertures 96 illustrated in FIGS. 12a and 12b.

Thrust washer 114 is preferably injection molded with a composition including a self-lubricating plastic material and an electrically conductive material to provide suitable continuity therethrough. In an exemplary embodiment the composition includes about 70% nylon 6/6 and about 30% carbon fiber. Suitable washers for the present invention manufactured by SCP Plastics, Inc. of Boonville, Miss. and available from Raffel Product Development Co., Inc. of Saukville, Wis. These properties simultaneously provide a washer having sufficient lubricity and abrasion resistance to the moving links 37 and rivet with which it rotationally engages. Furthermore, these properties provide a washer having a surface hardness high enough to prevent the rivet from penetrating first face 116 during the riveting process. It should be appreciated that alternative materials and/or compositions having similar properties may also be implemented, understanding that a thrust washer 114 having a relatively high durometer tends to be more rigid than a thrust washer 114 having a relatively low durometer and, therefore, may be more susceptive to fracturing under loading in the above-described pivot joint application. Additionally, compositions having a higher ratio of electrically conductive material, such as carbon, to self-lubricating material, such as nylon, may be less flexible and, therefore, more susceptible to fracture.

When rivet joints 68, 68a (FIGS. 10a, 10b) are assembled, rivet 40 is interposed through central aperture 118. Central aperture 118 is sized to accommodate tenon 54 if thrust washer 114 is substituted for thrust washer 80. In this configuration, first face 116 engages connecting link 37c and second face 120 engages connecting link 37b. Central aperture 118 is sized to accommodate spring shoulder 70 if thrust washer 114 is substituted for thrust washer 82. In this configuration, first face 116 engages connecting link 37a and second face 120 engages connecting link 37c. In this manner, thrust washer 114 provides for a low friction joint and a closed electrical circuit between the connecting links 37. Electricity is conducted through thrust washer 114 and substantially uniformly across faces 116, 120 to enable electrostatic painting of the pantograph linkage mechanisms 34. Specifically, thrust washer 114 ensures that a sufficient voltage potential between the linkage to be painted and the paint being applied during the e-coat paint process.

One skilled in the art will appreciate that spring shoulder bushing 70 may also be fabricated with a conductive plastic material similar to thrust washer 114 described above. In this manner, conductivity through the pivot joint may be further enhanced for electrostatic painting, while maintaining the integrity of the rivet joint.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A rivet system pivotally coupling a first connecting link and a second connecting link, the improvement comprising:
    a rivet having an enlarged head portion and a shank portion including a shoulder portion adjacent to said head portion and a tenon portion extending from said shoulder portion, said shank portion received within apertures formed through said first and second connecting links;
    a thrust washer received on said tenon portion interposed between said first connecting link and said second connecting link, said thrust washer being fabricated of a composition having a plastic material and an electrically conductive material, which substantially uniformly conducts electricity between said first and second connecting links;
    a spring bushing received on said shank portion having a washer interposed between said first connecting link and said enlarged head portion, and a bush portion received within said aperture formed in said first connecting link, said spring bushing being fabricated of a low friction plastic material and adapted to provide an axial thrust within said rivet system.

2. The rivet system of claim 1 wherein said composition comprises nylon and carbon.

3. A rivet system of the type having a rivet pivotally coupling a first connecting link, a second connecting link and a third connecting link, the improvement comprising:
    a rivet having an enlarged head portion and a shank portion having a shoulder portion adjacent to said head portion and a tenon portion, said shank portion received within apertures formed through said first, second and third connecting links;
    a first thrust washer received on said tenon portion interposed between said first connecting link and said second connecting link, said first thrust washer being fabricated of a composition having a plastic material and an electrically conductive material, which substantially uniformly conducts electricity between said first and second connecting links;
    a second thrust washer interposed between said first connecting link and said third connecting link, said shoulder portion received within said second thrust washer and said third connecting link, said second thrust washer being fabricated of said composition having a plastic material and an electrically conductive material, which substantially uniformly conducts electricity between said first and third connecting links;
    a spring bushing received on said shank portion having a washer interposed between said first connecting link and said enlarged head portion, and a bush received within said apertures formed in said second and third connecting link, said spring bushing being fabricated of a low friction plastic material and adapted to provide an axial thrust within said rivet system.

4. The rivet system of claim 3 wherein said composition comprises nylon and carbon.

* * * * *